United States Patent [19]
Powell

[11] Patent Number: 5,455,209
[45] Date of Patent: Oct. 3, 1995

[54] LEAD-FREE CERAMIC INSULATOR

[75] Inventor: Bob R. Powell, Birmingham, Mich.

[73] Assignee: General Motors Corporation, Detroit, Mich.

[21] Appl. No.: 333,888

[22] Filed: Nov. 3, 1994

Related U.S. Application Data

[63] Continuation-in-part of Ser. No. 139,579, Oct. 19, 1993, abandoned.

[51] Int. Cl.⁶ .............................. C03C 8/14; H01B 17/00
[52] U.S. Cl. ............................ 501/17; 501/32; 501/128; 174/137 R; 174/138 J
[58] Field of Search ................ 501/17, 32, 128; 174/137 R, 138 J

[56] References Cited

U.S. PATENT DOCUMENTS

| | | | |
|---|---|---|---|
| 2,072,460 | 3/1933 | Malinovsky | 501/32 |
| 3,097,101 | 7/1963 | Lester | 174/137 B |
| 4,037,188 | 7/1977 | Frey et al. | 338/174 |
| 4,636,617 | 1/1987 | Peterson et al. | 219/375 |

*Primary Examiner*—Deborah Jones
*Attorney, Agent, or Firm*—Cary W. Brooks

[57] ABSTRACT

This invention relates to a lead-free ceramic insulator, such as that utilized in headlamp switching assemblies. The composition utilized to make the lead-free ceramic insulator includes low melting glasses which form low-viscosity liquids at low temperatures. The glasses generally contain alkali and/or alkaline earth oxides and boron oxide. Aluminum oxide may be added to compensate for the alkali and alkaline earth containing glasses which are sensitive to corrosion by water. The compositions have a low sintering temperature.

6 Claims, 1 Drawing Sheet

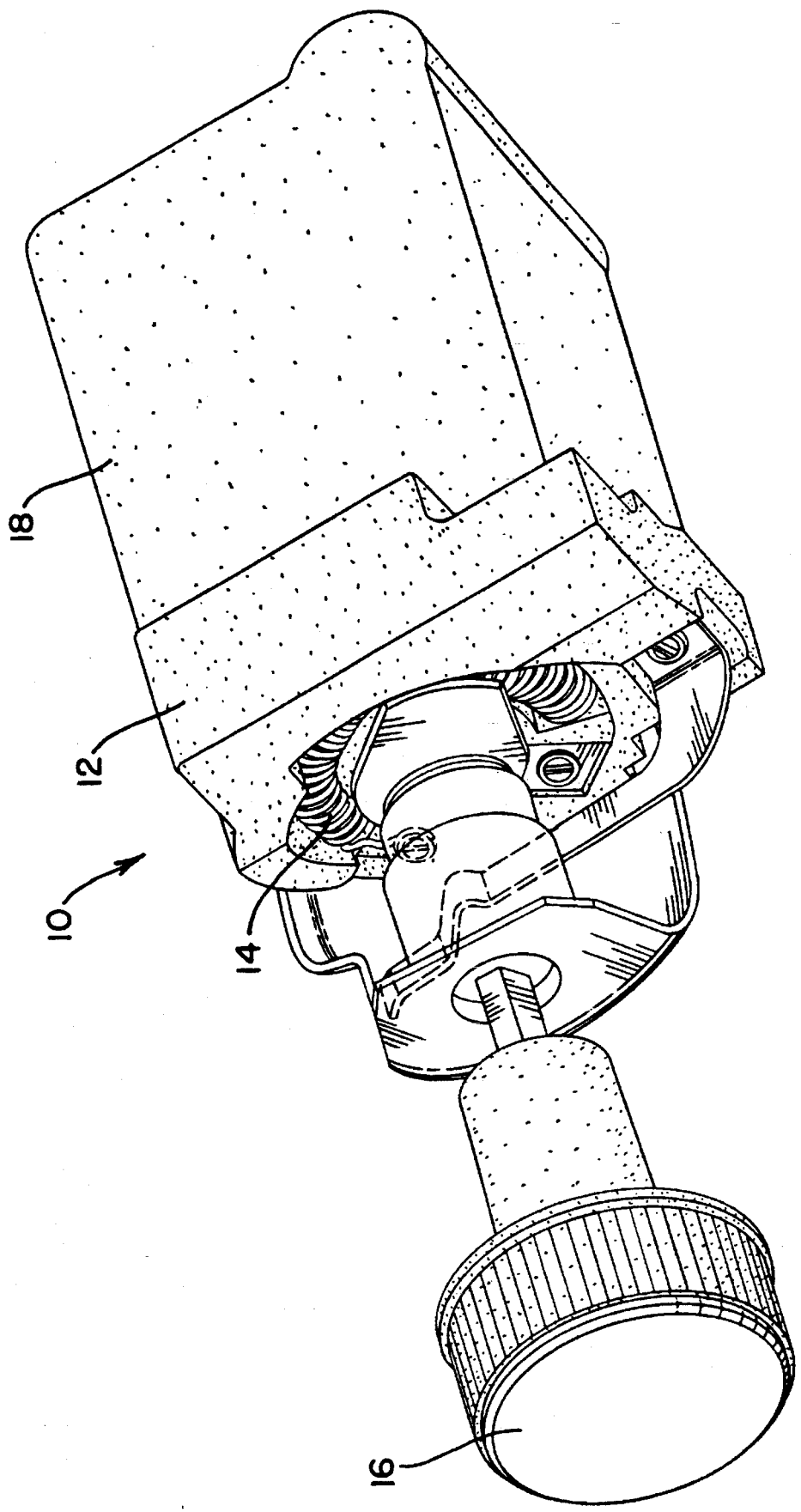

LEAD-FREE CERAMIC INSULATOR

This is a continuation-in-part of application Ser. No. 08/139,579 filed Oct. 19, 1993, now abandoned.

FIELD OF THE INVENTION

This invention relates to lead-free ceramic insulator compositions and more particularly to lead-free ceramic compositions used to manufacture the insulator for headlamp switch assemblies.

BACKGROUND OF THE INVENTION

Ceramic insulators have been utilized in a variety of electrical devices. These ceramic insulators are often prepared from compositions containing lead, such as lead silicate. The lead is utilized to lower the firing temperature of the ceramic material and to promote bonding and sintering of other constituents in the ceramic used to form the insulator. However, when electric devices having lead-containing ceramic insulators are mass produced, even a small amount of lead contained in the insulator becomes a concern. Thus, it would be desirable to develop a ceramic insulator that is lead free for use in manufacturing electrical devices.

SUMMARY OF THE INVENTION

This invention relates to a lead-free ceramic insulator, such as that utilized in headlamp switch assemblies. The composition utilized to make the lead-free ceramic insulator includes low melting glasses which form low-viscosity liquids at low temperatures. The glasses generally contain alkali and/or alkaline earth oxides and boron oxide. Aluminum oxide may be added to compensate for the alkali and alkaline earth-containing glasses which are sensitive to corrosion by water. The compositions have a low sintering temperature.

These and other objects, features and advantages of the invention will become apparent from the following brief description, detailed description and appended claims and drawings.

BRIEF DESCRIPTION OF THE DRAWING

The drawing illustrates a headlamp switch assembly including a ceramic insulator according to the present invention.

DETAILED DESCRIPTION

The drawing illustrates a headlamp switch assembly 10 including a lead-free ceramic insulator 12, dash light dimmer coil 14, and dimmer control knob 16 according to the present invention. The insulator includes a recess formed therein for carrying a heat generating component. The sintered lead-free insulator and compositions used to make the same include less than 1 weight percent lead-containing compounds, and preferably from 0.0 to 0.2 weight percent lead-containing compounds.

The insulator electrically and thermally isolates the dash light dimmer coil 14 from the rest of the headlamp switch assembly 18. Primarily, the ceramic insulator houses the dimmer coil 14 and prevents damage to the switch assembly from heat generated by the dimmer coil. The lead-free ceramic insulator may be prepared from steatite ceramic compositions which contain low melting glasses which form low viscosity liquids at low temperatures and are essential in sintering the overall composition at desired manufacturing temperatures below 1200°. Preferably, the low melting glasses have a viscosity ranging from about 10 to about 100 poises, at temperatures ranging from about 700° to about 1000° C. These glasses generally contain alkali and/or earth oxides, and boron oxide. Alkaline glasses include oxides of alkali metals including metals in Group IA of the Periodic Table, i.e., lithium, sodium, potassium, rubidium, cesium, and francium. Alkaline-earth oxides include oxides of alkaline-earth metals such as calcium, barium, strontium and radium (Group IIA of the Periodic Table). Because the alkali and/or alkaline earth-containing glasses are sensitive to corrosion by water, aluminum oxide may be added to the compositions. These low melting glasses are used as finely ground powders (frits) having particle sizes ranging from less than 75 microns and most preferably about 10 to about 30 microns.

A lead-free ceramic powder composition according to the present invention includes about 95 to about 98 weight percent of ceramic materials, about 2 to about 4 weight percent of binders, and about 0 to about 2 percent of a die pressing lubricant. The binders and the lubricant are burned out during sintering. The ceramic materials portion may include Talc ($3MgO.4SiO_2.H_2O$), Feldspar ($K_2O.Al_2O_3.6SiO_2$), Kaolin ($Al_2O_3.2SiO_2$) and a low melting glass frit portion including alkali and/or alkaline earth oxides, and boron oxide which may be 15 to 35, preferably 15 to 25, weight percent of the ceramic portion. The alkali and/or alkaline-earth oxide and boron oxide are present in an amount sufficient to break up the $SiO_2$ amorphous (glass) structure so that the composition flows at a lower temperature. Table 1 describes four different low melting glass frit formulation by weight parts used to make insulators.

TABLE 1

| | Ceramic Formulation | | | |
| --- | --- | --- | --- | --- |
| Compound | 3226 | 3227 | FB276 | CC263 |
| $SiO_2$ | 51.5 | 40.8 | 54.3 | 52.0 |
| $Li_2O$ | <0.3 | <0.2 | <1.1 | <0.2 |
| $Na_2O$ | 7.1 | 12.5 | 1.5 | 1.4 |
| $K_2O$ | 0.4 | 4.1 | 2.7 | 4.0 |
| MgO | <0.2 | <0.2 | <0.8 | <0.8 |
| CaO | <4.2 | <1.4 | <14.0 | <14.0 |
| SrO | <0.2 | <0.1 | <5.9 | <5.9 |
| BaO | <0.1 | <0.1 | <0.2 | <0.2 |
| $B_2O_3$ | 34.2 | 26.1 | 18.7 | 16.4 |
| $Al_2O_3$ | 1.8 | 15.3 | 9.1 | 11.0 |
| PbO | <1.1 | <0.1 | <1.0 | <0.1 |
| $ZrO_2$ | <0.2 | <0.1 | <1.4 | <1.4 |
| Totals | 101.3 | 101.0 | 110.7 | 107.4 |

Suitable low melting glass frit powders are available from Ferro Corporation under Ferro Frit® numbers 3226, 3227, FB276P and CC263 as indicated in Table 1. A suitable binder includes polyvinyl alcohol, carbowax and a deflocculant. A suitable lubricant for die pressing includes zinc stearate.

Samples (500 grams each) of four different compositions were prepared. The powders and the lubricant were mixed together and then combined with water and dissolved binders. Approximately 60 percent water was required to achieve fluidity necessary for spray-drying.

The suspensions were sprayed dried in a Niro Atomizer spray dryer at inlet and outlet temperatures of 270 and 130 degrees C., respectively. The resulting powder was collected at two locations. Coarse powder rolled down the conical wall of the drying chamber and fell through a hole in the bottom, into a collection bottle. The fine powder was collected via a cyclone filter downstream of the drying chamber. The powder morphologies were determined by scanning electron microscope analysis.

The sprayed dried powders were pressed into disks using 1.27 and 1.91 cm-diameter steel dies at pressures ranging from 20.7 to 55.1 MPa. The disks were sintered in air using a heating schedule consisting of 9 degrees C./min. ramp to 400 degrees C., a ten minute hold for decomposition and driving off the binders and lubricant, a 9 degrees C./min. ramp to 1065 degrees C., and a 20 minute hold to sinter the ceramic. The cooling rate was 17 degrees C./min. to 600 degrees C. and furnace-cooled below 600 degrees. The weight, dimensions and density of each disk were measured before and after sintering. Table 2 describes the sintering behavior of the insulator compositions according to the present invention.

TABLE 2

| Frit ID | Compaction Pressure MPa | Bulk Density g/cc | Apparent Density g/cc | Residual Porosity percent | Shrinkage percent Perp | Shrinkage percent Para | Weight Loss percent |
|---|---|---|---|---|---|---|---|
| 3226 | 20.7 | 1.76 | 2.52 | 30 | 4.5 | 6.4 | 8.3 |
|  | 34.5 | 1.87 | 2.52 | 26 | 3.5 | 5.4 | 8.3 |
|  | 55.1 | 1.96 | 2.52 | 22 | 2.5 | 4.2 | 8.8 |
| 3227 | 20.7 | 1.83 | 2.64 | 31 | 3.0 | 5.0 | 6.2 |
|  | 34.5 | 1.94 | 2.64 | 27 | 2.5 | 4.5 | 7.8 |
|  | 55.1 | 2.06 | 2.64 | 22 | 2.0 | 3.9 | 7.3 |
| FB276 | 20.7 | 1.90 | 2.48 | 25 | 3.0 | 4.6 | 7.8 |
|  | 34.5 | 2.03 | 2.48 | 18 | 2.5 | 4.2 | 6.6 |
|  | 55.1 | 2.12 | 2.48 | 15 | 2.0 | 3.9 | 7.1 |
| CC263 | 20.7 | 1.85 | 2.67 | 30 | 3.0 | 3.9 | 6.6 |
|  | 34.5 | 1.95 | 2.67 | 25 | 2.0 | 3.6 | 6.8 |
|  | 55.1 | 2.08 | 2.67 | 21 | 2.0 | 3.4 | 6.7 |

In Table 2, final porosity and sintering shrinkage was shown to be functions of the frit used and the compaction pressure. Shrinkage was also a function of pressing direction. Perp and Para indicate shrinkage of the disk in the directions perpendicular, and parallel, to the pressing direction, respectively. Use of frit formulations, according to the present invention, in the ceramic all resulted in insulators with controlled shrinkage and dimensional stability (non-warpage). However, frit formulations 3226 tended to crack or delaminate slightly. The thermal insulating capacity, and shape and dimensional capability are similar to lead containing ceramic insulator composition. In one embodiment the invention includes a sintered ceramic insulator prepared from a composition including at least 95 weight percent of the ceramic material including about 15 to about 35 weight percent of low melting glass frits having a viscosity ranging from about 10 to about 100 poise at temperatures ranging from about 700° to about 1000° C., and less than 1 weight percent lead-containing oxide compound. In another embodiment the invention includes a sintered ceramic insulator prepared from a composition including at least 95 weight percent of a ceramic material, the ceramic material including about 15 to about 35 weight percent of at least one oxide selected from the group consisting of an alkali oxide, alkaline-earth oxide and boron oxide, and less than 1 weight percent lead-containing oxide compound.

The embodiments of the invention in which an exclusive property or privilege is claimed are defined as follows:

1. A sintered ceramic insulator prepared from a composition comprising:

at least 95 weight percent of a ceramic material comprising about 15 to about 35 weight percent of low melting borosilicate glass frits having a viscosity ranging from about 10 to about 100 poise at temperatures ranging from about 700° to about 1000° C.;

less than 1 weight percent lead containing oxide compound; and said insulator having a recess therein for a heat generating component.

2. A sintered ceramic insulator prepared from a composition comprising:

at least 95 weight percent of a ceramic material, said ceramic material comprising about 15 to 35 weight percent of boron oxide and at least one oxide selected from the group consisting of an alkali oxide and an alkaline-earth oxide;

less than 1 weight percent lead containing oxide compound; and said insulator having a recess therein for a heat generating component.

3. A sintered ceramic insulator as set forth in claim 2 wherein the boron oxide is present in about 15 to about 25 weight percent of said ceramic material.

4. A sintered ceramic insulator as set forth in claim 2 wherein the heat generating component is an electric coil.

5. A sintered ceramic insulator as set forth in claim 2 wherein said lead containing oxide compound is present in less than 0.1 weight percent of said ceramic material.

6. A sintered ceramic insulator as set forth in claim 2 wherein said ceramic material comprises about 40.8 to about 54 weight percent $SiO_2$.

* * * * *